April 25, 1967　　　　　D. W. YOUNG　　　　　3,315,339
TOOL FOR MOUNTING OR DEMOUNTING AUTOMOTIVE VALVE ASSEMBLIES
Filed Sept. 30, 1964　　　　　　　　　　　　3 Sheets-Sheet 2
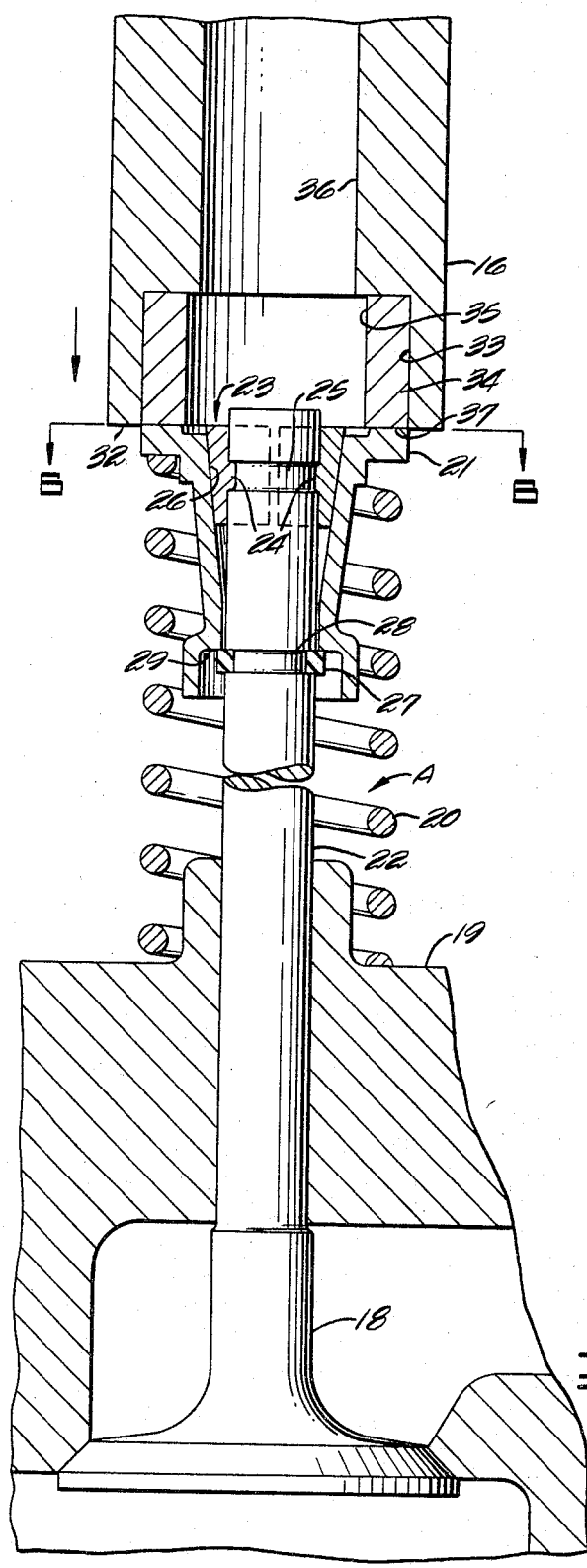
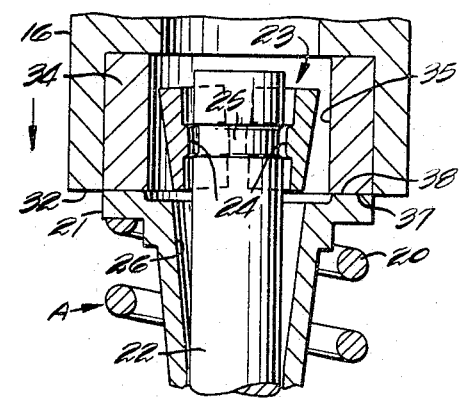
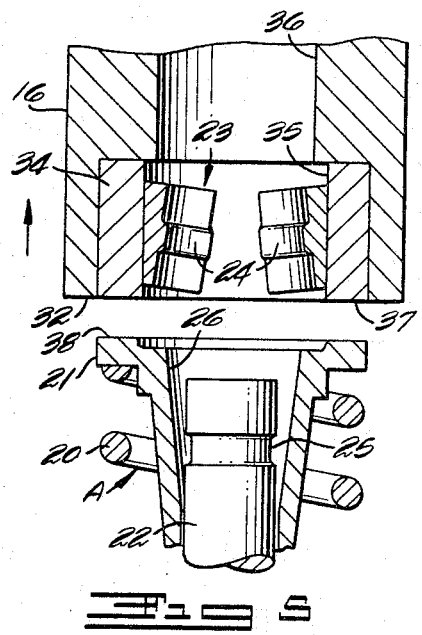
INVENTOR.
DAVID W. YOUNG
BY William Cleland
ATTORNEY

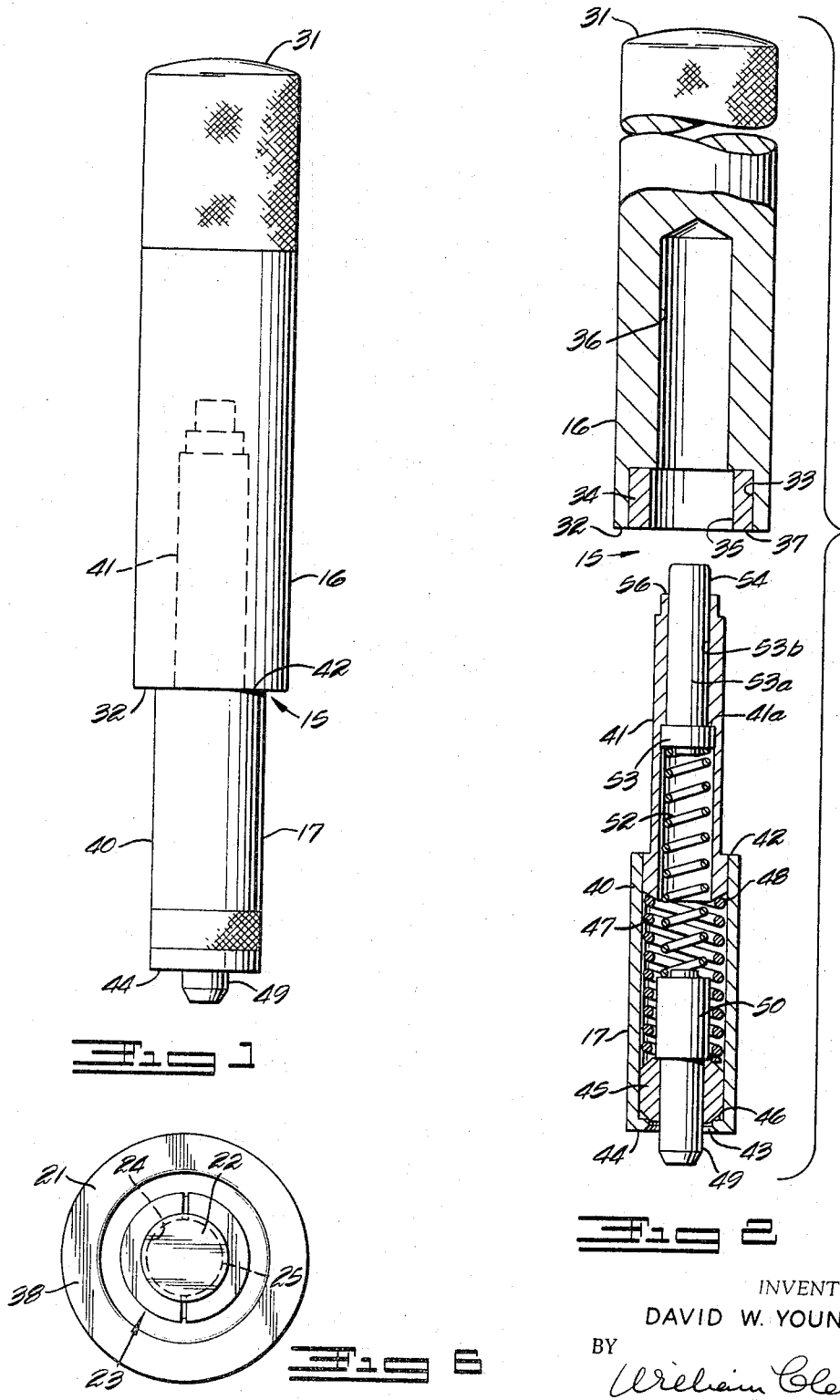

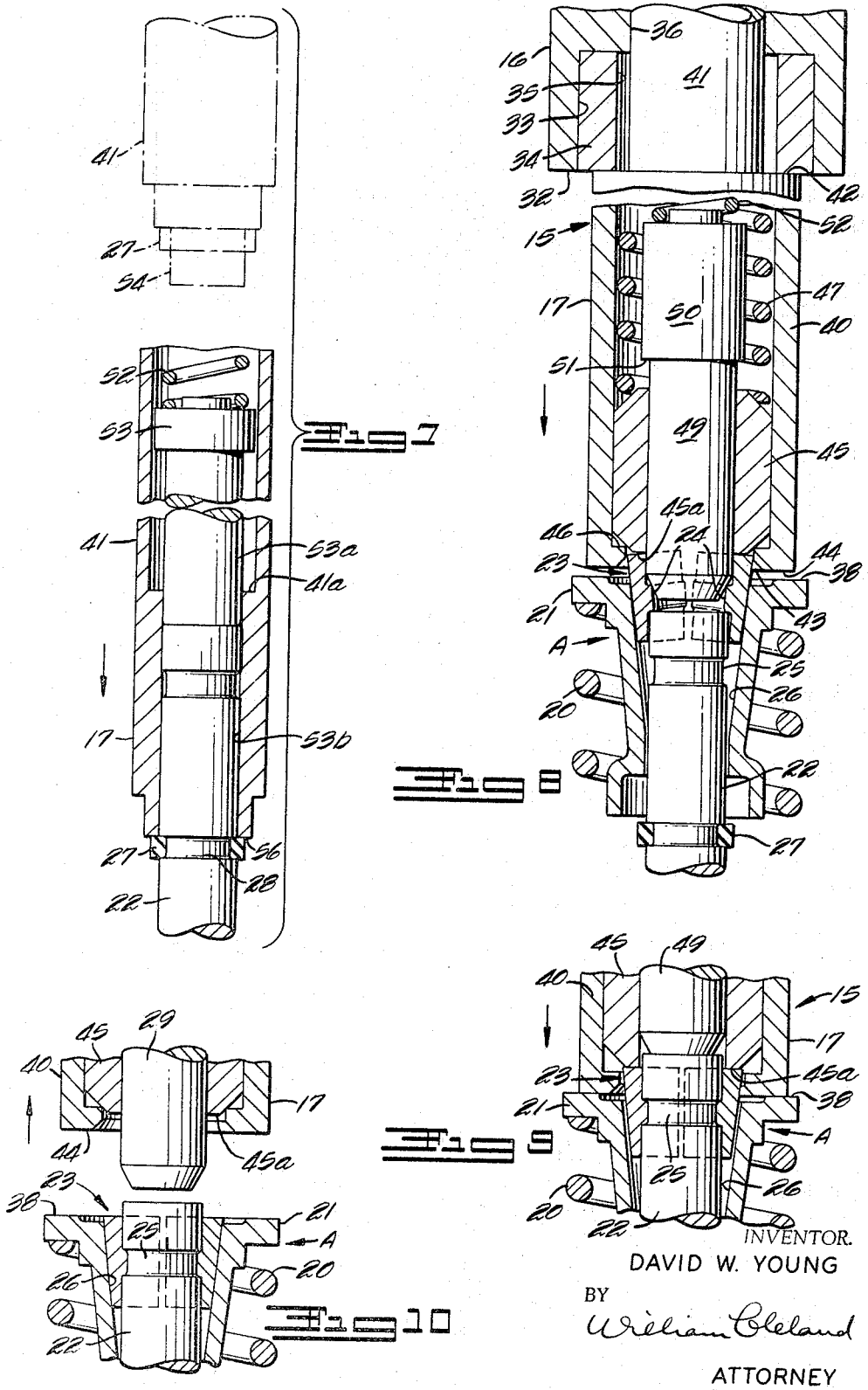

United States Patent Office 3,315,339
Patented Apr. 25, 1967

3,315,339
TOOL FOR MOUNTING OR DEMOUNTING
AUTOMOTIVE VALVE ASSEMBLIES
David W. Young, 900 Clifford Ave.,
Akron, Ohio 44306
Filed Sept. 30, 1964, Ser. No. 400,323
10 Claims. (Cl. 29—249)

This invention relates to automotive tools, and in particular relates to a tool for mounting and demounting automotive valve assemblies.

Valve assemblies of the character described are of well known type retained in engine blocks in association with inlet and outlet valve ports, and wherein each assembly includes a valve and a strong compression spring encircling a stem thereof, and yieldingly engaged between the valve and a spring retainer which also encircles the stem. The retainer is held in a given position for a limit of outward extension of the spring, as by means of a segmental tapered collet, wedgingly locked between the retainer and the valve stem by the spring action. Heretofore, it has been very difficult to demount such a valve assembly because a special, difficult-to-mount C-clamp was necessary to hold the spring compressed for removal of the segmental collet. It was similarly difficult to hold the valve spring compressed for remounting the assembly.

One object of the present invention is to provide a compact, economical tool for quickly and easily demounting valve assemblies with a minimum of manual effort, and without the use of cumbersome C-clamps or other means for retaining the valve springs compressed for removal of segmental collets.

Another object of the invention is to provide a tool of the character described including cooperating adapter means for quickly and easily mounting or remounting and locking the valve assembly with a minimum of manual effort, and likewise without use of spring-compressing C-clamps or other cumbersome means.

Another object of the invention is to provide a tool of the character described including simple, easy to operate adapter means for applying sealing gaskets on the valve stems while the assemblies are in demounted condition.

Another object of the invention is to provide a multiple-use, combination tool of the character described, including improved means for self-operatively, but manually releasably holding the tool parts together as a unit.

Still another object of the invention is to provide a tool of the character described which is provided with self-operating means for receiving and releasably retaining the collet segments against loss of the same when the tool is utilized for demounting the valve assembly.

These and other objects of the invention will be manifest from the following brief description and the accompanying drawings.

Of the accompanying drawings:

FIGURE 1 is a side elevation of a two-part combination tool embodying the feature of the invention.

FIGURE 2 is an exploded view thereof, partly broken away, and generally in vertical cross-section to show the cooperating structures of valve mounting and valve demounting parts of the combination tool.

FIGURE 3 is an enlarged fragmentary cross-section of the valve demounting tool part in association with a valve assembly, for the beginning of a valve demounting cycle of operation of the tool part.

FIGURE 4 is a similar fragmentary cross-section of a part of FIGURE 3, but at a point in the demounting operation in which the tool part has been momentarily impacted to compress the valve spring and release a segmental locking collet from a spring retainer on the valve stem.

FIGURE 5 is a view corresponding to FIGURE 4, showing the demounting tool withdrawn from the demounted spring assembly and locking collet segments magnetically retained in the tool.

FIGURE 6 is an enlarged horizontal cross-section taken on the line 6—6 of FIGURE 3 to show the locked relationship of the spring retainer on the valve stem.

FIGURE 7 is an enlarged fragmentary cross-section of the upper end of the adapter tool shown in the bottom portion of FIGURE 2, but in a full line position in which it has been operated to place an elastic sealing gasket on the valve stem, the chain-dotted lines illustrating the manner of mounting the gasket on the adapter prior to this operation.

FIGURE 8 is an enlarged fragmentary cross-section, corresponding to FIGURE 3, but illustrating use of the combination tool of FIGURES 1 and 2 in a preliminary position for applying a pre-positioned locking collet to mount or remount the valve assembly.

FIGURE 9 is a fragmentary cross-section of a portion of FIGURE 8, but at a point in which the valve retainer has been yieldingly impacted and the pre-positioned collet has been urged by delayed-action means into locking position with repsect to a groove on the valve stem.

FIGURE 10 is a view corresponding to FIGURE 9, but illustrating the tool withdrawn and the spring retainer spring urged into full locking wedging engagement with the collet.

Referring to FIGURES 1 and 2 is particular, and to FIGURES 3 to 10 in general, there is illustrated a combination tool 15, including a valve demounting tool part 16 and a valve mounting tool part 17. That is, the parts 16 and 17 are used together for mounting a conventional spring-pressed valve assembly A, as illustrated in FIGURES 1 and 8 to 10, and the part 16 is used alone for demounting such an assembly, as illustrated in FIGURES 3 to 6.

The assembly A is of the general type wherein a valve 18 is reciprocably mounted in an engine block 19 to open and close an inlet or outlet port and is yieldingly urged toward a closed position by a strong compression spring 20 engaged between the engine block and a spring retainer 21 on valve stem 22. The retainer 21 is held locked on stem 22 as by a tapered, segmental collet or keeper 23 having inner rib portions 24 engaged in an annular groove 25 on the valve stem and by being wedgingly engaged with a tapered wall 26 of the collet. The arrangement is such that the collet is locked against movement on the stem in outward direction, and is held against opposite movement on the stem by valve spring 20. In the typical valve assembly shown, an elastic gasket or oil-sealing ring 27 is retained in a second annular groove 28 in the valve stem, normally to be in oil-sealing engagement with a peripheral shoulder 29 on an inner end portion of the retainer (see FIGURE 3).

The valve demounting tool part 16 may be an elongated rigid, metal body having a somewhat rounded outer impacting end 31, and an axially opposite, flat inner end 32, which is bored at 33 to have affixed therein a cylindrical, permanent magnet 34, having a cylindrical passage or recess 35 therethrough, and communicating with a cylindrical recess 36 of smaller diameter in said body. The exposed inner end 37 of the magnet 34 is flush with the corresponding flat end 32 of the body 16 for flatwise engagement with the outer, generally flat face 38 of the valve spring retainer 21, for example, to have the inner wall 35 of the magnet 34 freely encompassing the segmental collet 23, as shown in FIGURE 3.

In use of the tool part 16 for demounting a spring assembly A, part 16 is firmly held positioned endwise on the retainer 21 as described above in connection with FIGURE 3. With one hand holding this tool part so positioned, the operator uses the butt of his other hand, or a rubber mallet, to strike the rounded outer end 30 with a sharp blow, and thereby to provide momentary forceful impact to the retainer against resilient opposition of the valve spring 20. This causes sufficient inward movement of the retainer with respect to the valve stem, as shown in FIGURE 4, to release the collet segments from locking engagement with the valve stem, so that the segments are magnetically drawn to the magnet 34 and adhere to the wall thereof, as shown in FIGURE 5. Upon removal of tool part 16 the valve assembly A is otherwise easily separable from the engine block. The valve demounting operation requires only a matter of seconds to accomplish as described, and a number of such brief operations may be performed in quick succession, in which case the collet segments from the several valve assemblies will be retained within the magnetized recess portions of the tool part 16 for later retrieval, as by insertion of a finger therein.

Referring particularly to FIGURES 1, 2 and 8, the valve mounting tool may include adapter part 17 with the part 16 releasably attached thereto as a hand grip and impacting member for the same, as best shown in FIGURES 1 and 8. To this end, the part 17 may include a hollow cylindrical housing 40 having affixed thereto an axially extending shank 41, of reduced diameter adapted to be slidably inserted in the recess extension 36 of part 16, until a peripheral shoulder 42 defined by the shank engages the magnet 34 (see FIGURE 8). Thus, the adapter 17 will be tenaceously gripped on the handle part 16 by magnetic attraction.

The lower end of adapter part 17 is formed with an opening 43 defining a flat peripheral seat portion 44 for selective impacting engagement with the top face 38 of spring retainer 21, when axially aligned with the upwardly exposed end of valve stem 22, as shown in full lines on FIGURE 8, in a manner to be described later in connection with the valve mounting or remounting operation.

Collet positioning means may be provided in the housing 40 in the form of a collar 45 axially slidably mounted within the housing, and normally yieldingly held seated against an inwardly presented peripheral seat 46 defined by opening 43, thereby to have an annular portion 45a of the collar freely exposed outwardly through said opening 43, to be in alignment with pre-positioned segments of collet 23 (see FIGURE 8). For this purpose a compression spring 47 of lesser power than the valve spring 20 is yieldingly engaged between the collar 45 and an opposite end shoulder portion 48 in housing 40 (see FIGURE 2). The collet-positioning means may also include a collet-centering pin 49 which is axially slidably received through the collar 45 normally to have a tapered end presented freely outwardly of the face 44 of the housing. For limiting outward extension of pin 49 with respect to collar 45, the pin has an enlarged inner extension or head 50 defining an annular shoulder 51 normally held yieldingly engaged with the collar by a compression spring 52 of lesser power than spring 47. The spring 52 extends between the inner end of the head 50 and a plunger 53 likewise to hold the same against a seat 41a within the shank 41. Plunger 53 has a reduced cylindrical portion 53a slidably received axially through an aperture 53b in the corresponding end of shank 41, and normally having a predetermined extent 54 protruding freely from the end of shank 41.

For quickly positioning a gasket 27 on the valve stem 22, prior to mounting or remounting the spring assembly, it is first expanded onto the exposed stem portion 54, as shown in chain-dotted lines in FIGURE 7. Next, the tool part 17 is moved to engage the end of stem portion 53 against the upper end of the valve stem, and then is further moved axially to receive a predetermined extent of the valve stem 22 within the plunger passage 53a. Accordingly, the gasket 27 will be urged along the valve stem 22, by the extreme end 56 of shank 41, until the gasket snaps into its groove 58 in stem 22, as shown in full lines in FIGURE 7. Thus, it is seen that the spring 52 serves a double purpose of yieldingly supporting plunger 53 and centering pin 49.

Referring now to FIGURES 8, 9 and 10, for mounting or remounting the spring assembly, the tool part 17 is used magnetically attached to impacting tool part 16 (see FIGURE 8). To this end, the valve spring 20 is pre-assembled substantially as shown in FIGURE 8, with the valve 18 manually or otherwise firmly supported, the spring retainer 21 supported on the valve spring 20, and the segments of collet 23 more or less loosely pre-positioned between the upper end of the fixedly backed and supported valve stem 22 and the tapered wall 26 of the retainer. Now, the combination tool 15 is moved downwardly in axial alignment with the valve stem, until the aligning pin 49 yieldingly engages within the upper portion of collet 23, and the tool 15 is further axially moved downward, against the yielding resistance of the smaller spring 52, until the exposed annular portion 45a of collar 45 rests on the upper edges of the collet segments and the end face 44 of housing 40 rests or comes substantially close to resting on the upper side of retainer 21, as shown in full lines in FIGURE 8. Upon briskly striking or impacting the upper end 31 of impacting part 16, the face 44 of part 17 engages and momentarily yieldingly moves the retainer 21 a substantial distance before sufficient clearance is provided for the collar 45, with delayed firm action, to urge the collet segments into locking engagement of the ribs 24 thereof in the groove 25 in the valve stem, as shown in FIGURE 9, before the spring 20 urges the retainer 21 into wedging relationship to the collet segments as shown in FIGURE 10. This valve-mounting operation requires only a few seconds to perform, and a number of such operations may be performed in quick succession as in the case of the valve demounting operation.

Thus has been provided, a simple, easy to operate, combination tool, which accomplishes the above described functions thereof in accordance with the stated objects of the invention.

Modifications of the invention may be resorted to without departing from the spirit thereof or the scope of the appended claims.

What is claimed is:

1. A tool for use on an automotive valve or like assembly of the type including a spring-pressed retainer means held locked on a stem by a separable collet segment wherein the stem and the collet have interlocking portions normally holding the collet and the retainer in a position for limited extension of the spring, said tool comprising: a rigid impact member having a recess in one end thereof defining an axially outwardly presented peripheral seat adapted to be engaged with the spring retainer means with said recess overlying the collet, and an opposite impact receiving end adapted to receive axial impacting force momentarily to urge said engaged member axially against the yielding action of the valve spring, and thereby to release said collet from interlocking engagement with said stem; and peripherally disposed magnetic means mounted in said recess freely to encompass and receive the stem and said collet therethrough magnetically to draw the released collet segments radially outwardly of said stem, and thereby releasably to support the segments free of the stem.

2. A tool for use on an automotive valve or like assembly of the type including a spring-pressed retainer means held locked on a stem by a segmental collet wherein the stem and the collet have interlocking portions normally holding the collet and the retainer in a position for limited extension of the spring, said tool comprising: a rigid impact member having a recess in one end thereof defining an axially outwardly presented peripheral portion, and magnetic means lining the inwardly presented wall of said recess for removably retaining the released collet segments thereon; said tool including a selectively operable valve-mounting adapter provided with a reduced shank for reception within said recess of said member and defining an annular shoulder engageable with said one end of the member for valve mounting use thereof; said adapter having a peripheral seat portion on the other end thereof opposite said shoulder for selective engagement with the spring retainer, and collet positioning means on said other end of said adapter for urging a prepositioned collet into a said locked position thereof while said spring-pressed retainer is momentarily yieldingly moved by impacting force applied to the retainer through said rigid member, adapter, and seat portion, said adapter being releasably held on said member by said magnetic means.

3. A tool for use on an automotive valve or like assembly of the type including a spring-pressed retainer means held locked on a stem by a separable collet segment wherein the stem and the collet have interlocking portions normally holding the collet and the retainer in a position for limited extension of the spring, said tool comprising: a rigid body having an impact end and an opposite end recessed to define a retainer-engaging seat and an inwardly presented peripheral lip; a spring-pressed collar axially shiftable in said recess and normally yieldingly maintained in stop engagement with said lip; a spring-pressed collet centering pin mounted in said recessed end and slidably received through said collar, and normally projecting outwardly of the collar for yielding engagement with the end of the valve stem when said rigid body is positioned to engage said collar with a segmental collet to be inserted to locked position between the stem and the retainer, whereby upon momentary impaction of said body yieldingly to reciprocate said retainer the collet segments are yieldingly moved by said collar to impact the collet between the retainer and the valve stem.

4. A tool as in claim 3, wherein said collar is spring-pressed against said peripheral lip with slightly less pressure than the opposing yielding pressure applied to said retainer, whereby the locking impaction applied to the collet by said body is by slightly delayed action through said collar.

5. A tool as in claim 3, said body having a spring-pressed plunger mounted in the impact end thereof for limited yielding inward movement, the end of said plunger normally protruding from the impact end of the rigid body, whereby the protruding end of said plunger with a resilient sealing ring thereon is yieldingly retractible within the member by pressing the protruding end against the end of the valve stem to project the protruding end within the member and whereby engagement of said impact end of the body with the sealing ring will push the ring a corresponding extent along the valve stem.

6. A tool for use on an automotive valve or like assembly of the type including a spring-pressed retainer means held locked on a stem by a separable collet segment wherein the stem and the collet have interlocking portions normally holding the collet and the retainer in a position for limited extension of the spring, said tool comprising: a rigid impact member having a recess in one end thereof defining an axially outwardly presented peripheral seat adapted to be engaged with the spring retainer means with said recess overlying the collet, and an opposite impact receiving end adapted to receive axial impacting force momentarily to urge said engaged member axially against the yielding action of the valve spring, and thereby to release said collet from interlocking engagement with said stem; and magnetic means mounted in said recess freely to encompass said collet segments magnetically to draw the released collet segments radially outwardly of said stem, and thereby releasably to support the segments free of the stem; said magnetic means comprising a tubular magnet adapted to receive the stem and collet freely therethrough.

7. A tool as in claim 6, said tubular magnet having an end thereof substantially flush with said peripheral seat of the impact member as for magnetically gripping the retainer means.

8. A tool for use on an automotive valve or like assembly of the type including a spring-pressed retainer means held locked on a stem by a separable collet segment wherein the stem and the collet have interlocking portions normally holding the collet and the retainer in a position for limited extension of the spring, said tool comprising: a rigid impact member having a recess in one end thereof defining an axially outwardly presented peripheral seat adapted to be engaged with the spring retainer means with said recess overlying the collet, and an opposite impact receiving end adapted to receive axial impacting force momentarily to urge said engaged member axially against the yielding action of the valve spring, and thereby to release said collet from interlocking engagement with said stem; and magnetic means mounted in said recess freely to encompass said collet segments magnetically to draw the released collet segments radially outwardly of said stem, and thereby releasably to support the segments free of the stem; said tool having a valve-mounting adapter provided with a reduced shank for reception within said recess of said impact member and defining an annular shoulder releasably attachable to said one end of the impact member by magnetic attraction to said magnetic means; said adapter having a peripheral seat portion on the other end thereof opposite said annular shoulder for selective engagement with the spring retainer, and collet positioning means on said other end of said adapter for urging a prepositioned collet into a said locked position thereof while said spring-pressed retainer is momentarily yieldingly moved by impacting force applied to the retainer through said rigid member, adapter, and seat portion.

9. A tool for use on an automotive valve or like assembly of the type including a spring-pressed retainer means held locked on a stem by a separable collet segment wherein the stem and the collet have interlocking portions normally holding the collet and the retainer in a position for limited extension of the spring, said tool comprising: a rigid impact member having a recess in one end thereof defining an axially outwardly presented peripheral seat adapted to be engaged with the spring retainer means with said recess overlying the collet, and an opposite impact receiving end adapted to receive axial impacting force momentarily to urge said engaged member axially against the yielding action of the valve spring, and thereby to release said collet from interlocking engagement with said stem; and magnetic means mounted in said recess freely to encompass said collet segments magnetically to draw the released collet segments radially outwardly of said stem, and thereby releasably to support the segments free of the stem; said tool having a valve mounting adapter provided with a reduced shank for selective reception within said recess of said impact member and defining an annular shoulder releasably attachable to said one end of the impact member for magnetic attraction to said magnetic means; said adapter having a peripheral seat portion on the other end thereof opposite said annular shoulder for selective engagement with the spring retainer, and collet positioning means on said other end of said adapter for urging a prepositioned collet into a said locked position thereof while said spring-pressed retainer is momentarily yieldingly moved by impacting force applied to the retainer through said rigid impact member, adapter, and seat portion; said collet positioning means including a spring-pressed element for delayed action impacting engagement with the prepositioned collet.

10. A tool for use on an automotive valve or like assembly of the type including a spring-pressed retainer means held locked on a stem by a separable collet segment wherein the stem and the collet have interlocking portions normally holding the collet and the retainer in a position for limited extension of the spring, said tool comprising: a rigid impact member having a recess in one end thereof defining an axially outwardly presented peripheral seat adapted to be engaged with the spring retainer means with said recess overlying the collet, and an opposite impact receiving end adapted to receive axial impacting force momentarily to urge said engaged member axially against the yielding action of the valve spring, and thereby to release said collet from interlocking engagement with said stem; and magnetic means mounted in said recess freely to encompass said collet segments magnetically to draw the released collet segments radially outwardly of said stem, and thereby releasably to support the segments free of the stem; said tool having a valve mounting adapter provided with a reduced shank for selective reception within said recess of said impact member and defining an annular shoulder releasably attachable to said one end of the impact member for magnetic attraction to said magnetic means; said adapter having a peripheral seat portion on the other end thereof opposite said annular shoulder for selective engagement with the spring retainer, and collet positioning means on said outer end of said adapter for urging a prepositioned collet into a said locked position thereof while said spring-pressed retainer is momentarily yieldingly moved by impacting force applied to the retainer through said rigid impact member, adapter, and seat portion; said collet positioning means including a spring-pressed element for delayed action impacting engagement with the prepositioned collet; said collet positioning means including guide means engageable with the collet segments to retain the same in centered relation during said delayed action engagement.

References Cited by the Examiner

UNITED STATES PATENTS 2,742,689  4/1926  Rocha _____ 29—249
3,065,528  11/1962  Marshall _____ 29—249

FOREIGN PATENTS 976,160  11/1964  Great Britain.

WILLIAM FELDMAN, *Primary Examiner.*

J. C. PETERS, *Assistant Examiner.*